July 18, 1950 J. S. KISH 2,515,604
AUTOMOBILE BUG DEFLECTOR
Filed Sept. 30, 1948
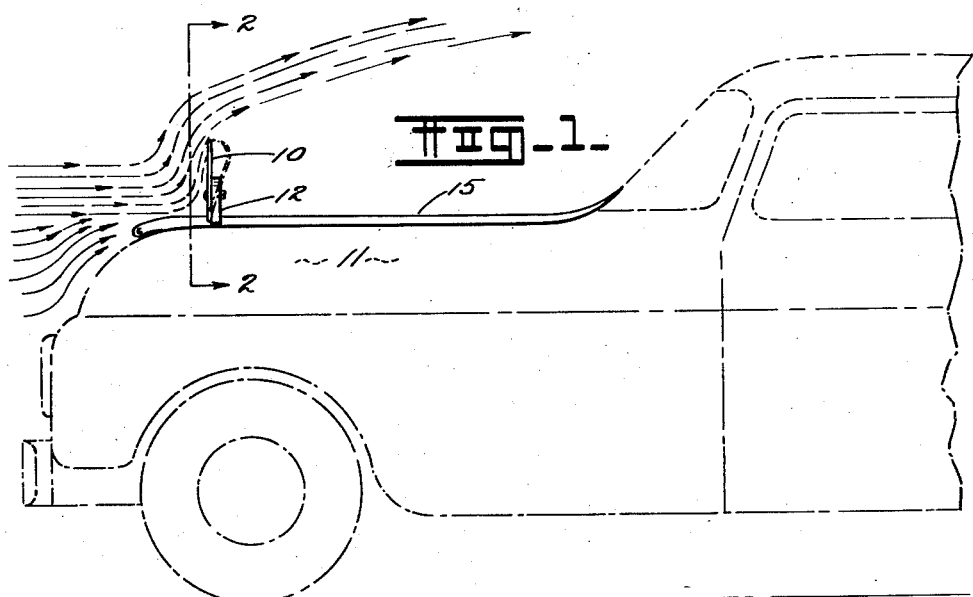
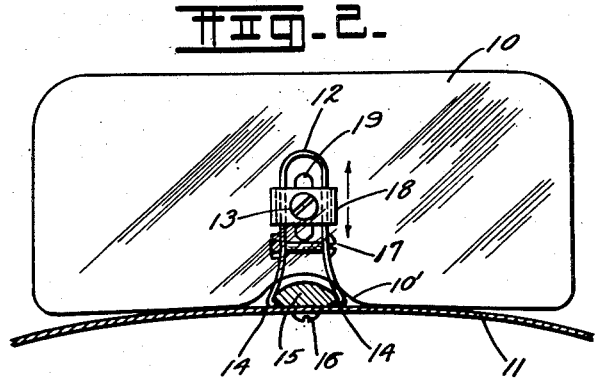
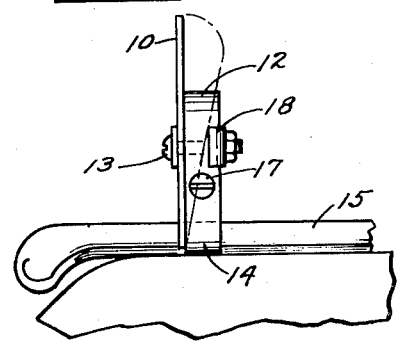
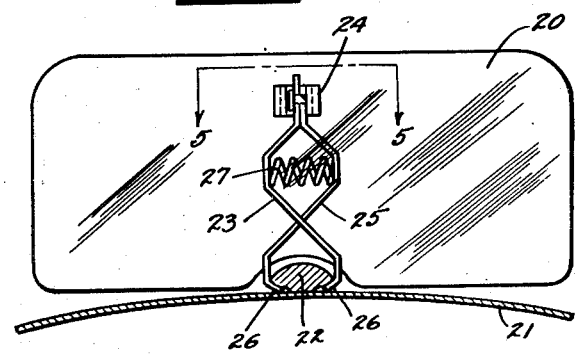
INVENTOR.
John S. Kish.
BY W. B. Harpman
ATTORNEY.

Patented July 18, 1950

2,515,604

UNITED STATES PATENT OFFICE 2,515,604

AUTOMOBILE BUG DEFLECTOR

John S. Kish, Youngstown, Ohio, assignor to Emanuel E. Evans, Poland, Ohio

Application September 30, 1948, Serial No. 51,897

6 Claims. (Cl. 296—91)

This invention relates to deflectors as applied to automobiles and more particularly to deflectors utilized for creating air currents serving to deflect bugs, rain and snow and the like from the windshield areas of the automobile.

The principal object of the invention is the provision of a deflector for application to the hood of an automobile.

A further object of the invention is the provision of a deflector including means enabling it to be positioned at various locations on the hood of an automobile.

A still further object of the invention is the provision of a deflector having clamp means for engaging the ornamental molding on the hood of an automobile.

A still further object of the invention is the provision of a deflector having spring tension clamping means for engagement with the longitudinally extending molding on the hood of an automobile.

The deflector shown and described herein comprises a simple and inexpensive device consisting primarily of an appropriately shaped section of transparent material such as plastic and means for mounting the same on the longitudinally extending molding on the hood of an automobile so that air currents are created thereby when the automobile is moving to deflect bugs, rain and snow in the air currents away from the windshield areas of the automobile.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side view of a portion of an automobile showing the deflector in position on the hood thereof. Broken lines indicate the deflection of air currents.

Figure 2 is a front view on an enlarged scale taken on line 2—2 of Figure 1.

Figure 3 is a front view of a modified form of deflector.

Figure 4 is a side view of the deflector shown in enlarged detail.

Figure 5 is a sectional elevation taken on line 5—5 of Figure 3.

By referring to the drawings and Figures 1, 2 and 3 in particular it will be seen that the preferred form of the deflector comprises a rectangular section of transparent somewhat flexible material 10 such as, for example, a section of transparent flexible material known as Plexiglas, and of a thickness of approximately $\frac{1}{32}$ of an inch and notched on its lowermost edge as indicated by the numeral 10' and supported in vertical relation and transversely to the hood 11 of an automobile by a vertically standing U-shaped clamp 12 to which the rectangular section of transparent plastic material 10 is secured as by means of a bolt and nut assembly 13. The lowermost portions of the U-shaped clamp 12 are inturned as indicated by the numeral 14 and are adapted for registry beneath the longitudinally extending molding 15 as by engagement beneath the respective edges thereof. This is best illustrated in Figure 2 of the drawings and by referring thereto it will be seen that the hood 11 is shown in cross section with the molding 15 secured longitudinally thereon as by means of a plurality of bolts 16.

The molding 15 is normally rounded at its edges which facilitates the application of the inturned ends 14 of the U-shaped clamp 12 thereto. A secondary bolt and nut assembly 17 is positioned through openings in the arms of the U-shaped clamp 12 so that the arms may be moved together and thereby effect a clamping operation with respect to the molding 15.

By referring to Figures 2 and 3 of the drawings it will be seen that two clamping means are shown, both of which are desirable but one of which may be eliminated if desired. For example, the bolt and nut assembly 13 is positioned through a U-shaped clamping piece 18, the arms of which engage the sides of the arms of the U-shaped clamp 12. A vertically elongated slot 19 is formed in the transparent plastic flexible material 10 which permits the section of flexible material 10 to be moved vertically for adjustment purposes with respect to the hood 11 and also permits the bolt and nut assembly 13 and the U-shaped clamp 12 to be moved vertically and more particularly to be moved downwardly so that the arms of the U-shaped clamp 12 are moved together to exert a clamping action on the molding 15. It will thus be seen that the device may be formed without the secondary nut and bolt assembly 17 heretofore referred to but under most conditions it will operate efficiently and retain itself in desired position on the hood of the automobile. The secondary nut and bolt assembly is provided to insure the positive retention of the deflector on the hood as the clamping action thereof combined with the clamping action of the clamping piece 18 will maintain the inturned ends 14 of the clamp 12 in registry with the molding 15 at all times.

In Figures 4 and 5 of the drawings a simpler, more readily attachable deflector is shown wherein the transparent deflector is indicated by the numeral 20, the hood on which it is positioned by the numeral 21 and the molding by the numeral 22. The deflector 20 is secured to a spring tension clamp 23 by means of a cleat 24, the clamp 23 comprising a pair of similarly formed but oppositely disposed arms, one of which, indicated by the numeral 25, is pivotally affixed to the other at its uppermost end and positioned through an enlarged opening in the other arm near its lowermost end 25'.

The lowermost end of the arms of the clamp are inturned as indicated by the numeral 26 and adapted for registry beneath the edges of the molding 22. A spring 27 is caged between the arms of the clamp so that it normally urges the arms apart near their uppermost ends, which action urges them together near their lowermost ends as they are closed, and one of the arms 25 is passed through an opening in the other arm midway between the upper and lowermost ends. The clamp 23 will be seen to comprise a device similar to the electric battery clamps provided for quick and satisfactory establishment of electrical connections between the conductors and battery terminals.

In its present application the clamp serves as a backing member for the deflector 20 as well as means for holding it in desired vertical position on the hood of the automobile and provides a device which is simple in construction and easy in application to the automobile and which may be readily removed by manual operation of the spring tension clamp 23. The detail of securing the deflector 20 to the clamp 23 by means of the cleat 24 is best shown in Figure 5.

It will thus be seen that preferred and modified forms of a bug deflector have been disclosed which differ from bug deflectors heretofore known in the art in that they may be positioned in the desired and indicated location on the hood of the automobile by simple engagement with the longitudinally extending molding thereof. It will be obvious that in the event no molding is provided a rivet or nut and bolt may be positioned through the hood and the deflector clamped thereto. It will be seen that when the deflector is positioned at a proper distance in front of the windshield and at a proper distance in back of the curving front end of the hood, the air currents created when the automobile is moving will be deflected upwardly and over the windshield and sidewardly around the two sides of the windshield. This occurs because the air currents are directed by the deflector sidewardly and upwardly which action, in combination with the normal air flow sidewardly and over the windshield, causes air-borne objects such as bugs, rain and snow to be lifted over the windshield or passed around the sides thereof. It will be recognized that the transparent deflector formed of the plastic material will bend slightly on a transverse plane (as shown in dotted lines in Figures 1 and 4 of the drawings) as well as on a vertical plane to adjust itself with respect to the speed of the automobile on which it is mounted and thereby maintain the desired deflecting action at all speeds.

It will thus be seen that the several objects of the invention are met by the bug deflector disclosed herein.

Having thus described my invention, what I claim is:

1. The combination of an automobile having a windshield and a hood in front thereof and an ornamental molding on said hood, a sheet of transparent plastic material and means for mounting the same in approximately vertical position transversely of the hood and spaced in front of the said windshield and on the said ornamental molding, said means comprising a clamping member secured to the sheet of transparent material near the center thereof and having depending arms, the lower ends of which are inturned for registry beneath the ornamental molding, and means for moving the said arms toward one another to clamp the same on the said molding.

2. The combination of an automobile having a windshield, a hood in front thereof and an ornamental molding extending longitudinally on said hood, a deflector comprising a sheet of transparent material positioned on a vertical plane on the hood in front of the windshield by mounting means, said mounting means comprising a spring clamp near the center of said sheet and including a pair of arms pivotally affixed to one another at their uppermost ends and crossed with respect to one another intermediate their uppermost and lowermost ends and having inturned sections on their lowermost ends and spring means normally urging the lowermost ends of the arms together.

3. The combination with an automobile having a hood and an ornamental molding on said hood extending longitudinally and centrally of the sides thereof, of a bug deflector including a sheet of material, and clamping means positioned substantially centrally of the ends of the sheet and secured thereto, and said clamping mean being engaged upon said ornamental molding and supporting the said sheet of material approximately vertically thereabove and transversely with respect to said molding and hood.

4. The combination with an automobile having a hood and an ornamental molding on said hood extending longitudinally and centrally of the sides thereof, of a bug deflector including a sheet of transparent flexible material, and clamping means secured thereto substantially centrally of the ends thereof and engaged upon said ornamental molding and supporting the said transparent flexible sheet in approximately vertical relation thereabove and transversely with respect to said molding and hood.

5. A bug deflector for attachment to an automobile hood having an ornamental molding thereon extending longitudinally and centrally of the sides thereof, said bug deflector including a sheet of material, and clamping means secured thereto approximately centrally of the ends of the sheet for attaching the same to the automobile hood molding to extend approximately vertically thereabove and transversely of the molding and hood, said clamping means including opposed arms extending near the lower part of said sheet and having lower terminal portions of a shape to fit about the automobile hood molding at opposite sides thereof.

6. A bug deflector for attachment to an automobile hood having an ornamental molding thereon extending longitudinally and centrally of the sides thereof, said bug deflector including a sheet of material, and clamping means secured thereto approximately centrally of the ends of the sheet for attaching the same to the automobile hood molding to extend approximately vertically thereabove and transversely of the molding and hood, said clamping means including opposed arms near the lower part of said sheet having lower terminal portions of a shape to fit about the automobile hood molding at opposite sides thereof, and means for moving said arms toward each other to grip the automobile hood molding.

JOHN S. KISH.

REFERENCES CITED

The following references are of record in the file of this patent:

UNITED STATES PATENTS

| Number | Name | Date |
|---|---|---|
| 1,443,993 | Koster | Feb. 6, 1926 |
| 2,236,846 | Davisson | Apr. 1, 1941 |
| 2,334,856 | Atkinson | Nov. 23, 1943 |
| 2,338,199 | Parke | Jan. 4, 1944 |